May 7, 1963  F. ENDTER  3,089,031
METHOD AND APPARATUS FOR TESTING STRUCTURE OF MATERIALS
BY MEANS OF ROENTGEN, GAMMA OR CORPUSCULAR RAYS
Filed Dec. 19, 1957  4 Sheets-Sheet 1

Friedrich Endter
INVENTOR

BY Bailey, Stephens & Huettig
ATTORNEYS

Friedrich Endter
INVENTOR

BY Bailey, Stephens & Huettig
ATTORNEYS

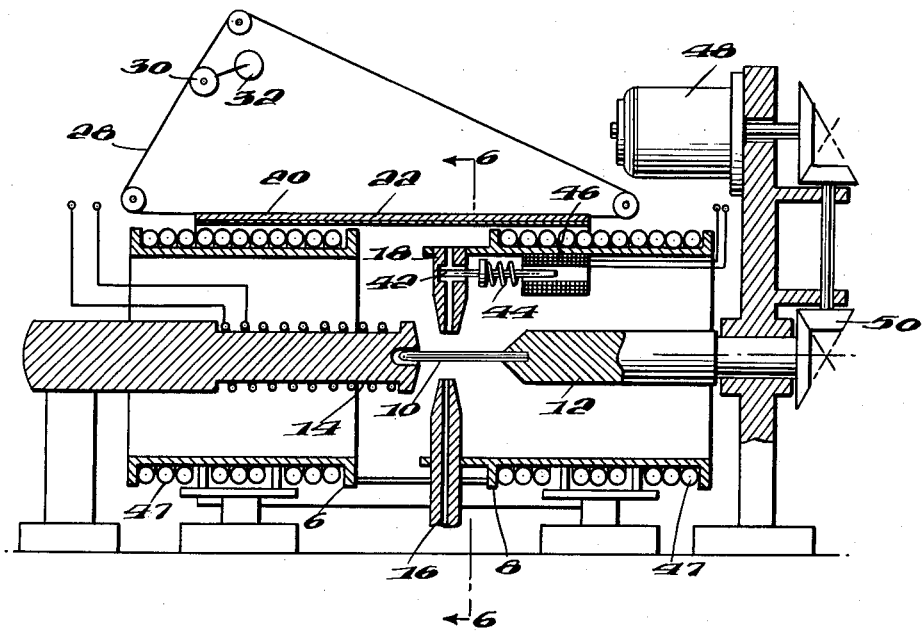

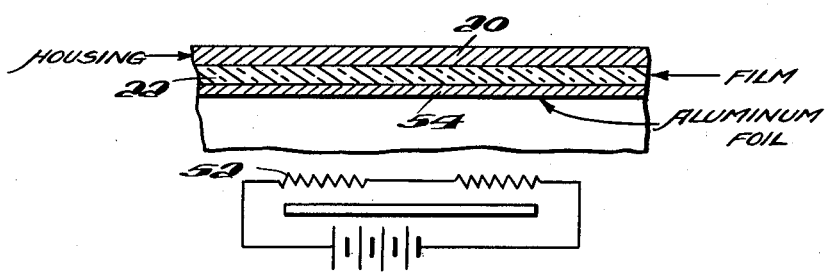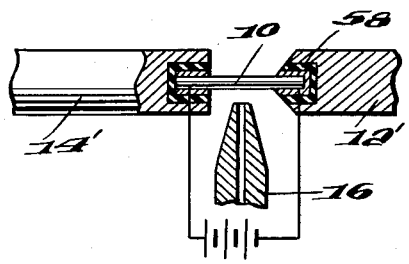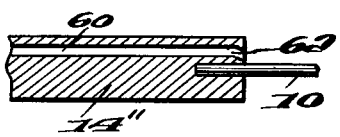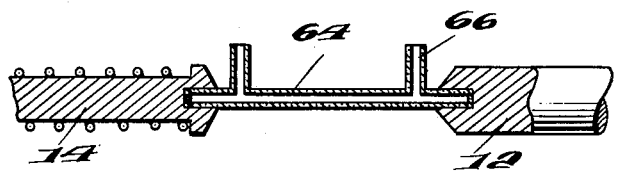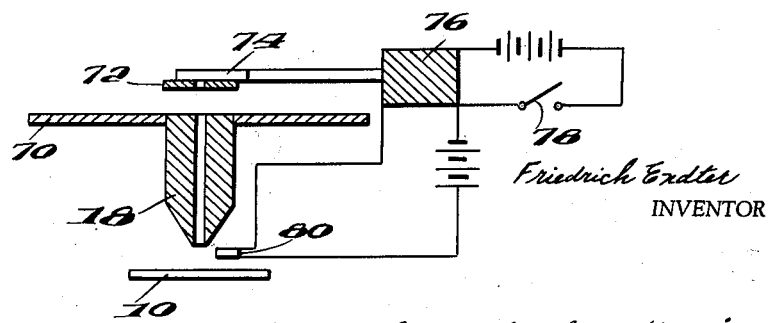

United States Patent Office 3,089,031
Patented May 7, 1963

3,089,031
METHOD AND APPARATUS FOR TESTING STRUCTURE OF MATERIALS BY MEANS OF ROENTGEN, GAMMA OR CORPUSCULAR RAYS
Friedrich Endter, Konstanz, Germany, assignor to Deutsche Gold- und Silver-Scheideanstalt, Frankfurt am Main, Germany
Filed Dec. 19, 1957, Ser. No. 703,971
Claims priority, application Germany Dec. 22, 1956
5 Claims. (Cl. 250—65)

The invention relates to the testing of the structure of materials by means of Roentgen, gamma or corpuscular rays (hereinafter referred to as "interference generating rays"), and particularly to a procedure for continuously following changes in the material of the same structural element, and it further relates to an apparatus for carrying out this process.

It is known that, by directing mono-chromatic and coherent Roentgen or corpuscular rays through a sufficiently small opening upon a body composed of crystals, an interference ray is produced, the geometric shape of which is a series of conical surfaces of different opening angles. These conical surfaces are so arranged that they have their common vertex at the source point of the ray and their axis extends in the direction of the primary ray which generates the interference. The opening angle of the conical surface and the intensity of the scattered radiation relative to the resulting diffraction cone are, with predetermined wave lengths of the primary ray, a specific function of the grain structure of the material which produces the diffraction.

For the use of this effect for carrying out grain structure analysis by means of Roentgen or corpuscular rays, numerous procedures have been described. In this connection, there is known the Debye-Scherrer process, which can be carried out in various modifications with plain or cylindrical photographic plates. Also, for working with electron streams, methods are known for photographing the diffraction diagram in different ways. In all of these processes, however, it is assumed that the grain structure and therefore the relative intensity and spatial distribution of the scatter radiation remain unchanged during the exposure of the photographic plate.

It is, however, of very great interest to be able to detect temporary structural changes uninterruptedly, and to discover changes in the materials which occur upon changes in temperature, chemical reactions, diffusion processes or mechanical deformations.

For this purpose, a procedure is known for the grain structure analysis of non-homogeneous objects by means of electron streams in which linear segments of the cones, which are produced by the different parts of an object having an extended surface or of a periodically changing object at the same position, are cut off and projected against a film moving at right angles to the longitudinal dimension of the segment. According to this procedure, which is also useful with Roentgen rays, the lines which appear in the diffraction diagram are formed only as short sections, which in the first approximation appear as straight lines and run parallel to the direction to movement of the film. The limiting of these line sections which make up the picture is achieved by slit-shaped diaphragms through which the film is exposed. The resulting diagram then has a band of straight lines arranged symmetrically to the central axis, and the interval between corresponding lines is a specific fixed function of the diffraction angle determined by the geometry of the photographic arrangement used, because the relative intensity of the single lines conforms to the material and spatial structure of the test piece and is dependent on the crystal size and crystal orientation. Differences in the lattice dimensions during the photographing appear as changes in line spacing; differences in structure of the test element as changes in intensity, through the disappearance or reappearance of the lines.

This procedure has, however, a serious disadvantage especially when using Roentgen rays, in that for the recording of the diffraction lines only a short line spacing can be obtained, so that the exposure time under certain conditions must be unduly long.

It has now been found unexpectedly that, both with electron and gamma rays, and especially with Roentgen rays, it is possible to obtain sufficiently sharp, continuously registered, diffraction diagrams for accurate measurement if, instead of limiting the interference rays which are used for recording in the known procedures, the unrestricted scatter rays of at least one scattering angle are permitted to fall upon a photographic sensitized layer which moves with a velocity determined by the intensity of the scatter rays. There is then no necessity for a closely limited screening out of the scatter ray field (although the primary ray is preferably limited to a narrow path, both in approaching and in leaving the test piece), so that according to the process of the invention it is possible to obtain a continuous line diagram with ordinary short exposures. This gives a more complete analysis of the diagram per unit of time, and also, by the elimination of the screens or diaphragms, allows greater latitude in the construction of the apparatus used.

The invention also makes it possible to provide a continuously recorded diagram with time markings.

For carrying out the invention, different types of apparatus can be provided. Their structure will principally depend upon the form of the photographic plate. This can be in the form of a cylinder whose longitudinal axis, in which the test piece is arranged, is perpendicular to the incoming rays, the film traveling during the recording in the direction of its longitudinal axis. But plane films or plates can be used, with the plate perpendicular to the primary ray, and either on the other side of the diffracting test piece from the ray source or, for recording reflected rays, between the test piece and the ray source.

Further objects and advantages of the invention will appear more fully from the following description, especially when taken in conjunction with the accompanying drawings which form a part thereof.

In the drawings:
FIG. 1 shows the pattern obtained by the known Debye-Scherrer process;
FIG. 1a shows a corresponding pattern obtained in accordance with the invention;
FIGS. 2a, 2b, 2c, 3 and 4 show other patterns obtained in accordance with the invention;
FIG. 5 shows in vertical section an apparatus for carrying out the invention, for the example of Debye-Scherrer-scattering;
FIG. 6 is a cross-section on the line 6—6 of FIG. 5;
FIG. 7 shows the use of metal foil for protecting the film against overheating;
FIG. 8 shows a further modification of the invention;
FIG. 9 shows another modification of the test piece holder;
FIG. 10 shows a holder for powdered material to be contacted by a gas; and
FIG. 11 shows a portion of still another modification.

FIG. 1 shows the opposed patterns of two continuous records made by the Debye-Scherrer process, of a platinum wire, using slit-diaphragms. FIG. 1a shows a similar record made according to the invention with unrestricted interference rays. It will be noted that the lines in both diagrams coincide, the difference being that in FIG. 1a the inner and outer lines are somewhat blurred which in no way lessens the utility of the diagram. It was unexpected that the use of an unrestricted interference ray, not, as previously, limited by a diaphragm to a very narrow section, could produce such satisfactorily useful patterns. This results in short exposure times and in simplification of the apparatus used.

FIGS. 2a, 2b and 2c show patterns obtained according to the invention, these being continuously recorded Roentgen diagrams of a platinum wire, the inside of which was heated for 25 hours at a temperature up to 600° C. At about 400° C., a quick grain enlargement takes place which is detectable by the dissolution of the lines to bands of points as shown in FIG. 2b.

This splitting up of the lines is produced by suitable choice of the speed of rotation of the test piece and of the speed of advancement of the film and it is a criterion of the progress of the crystal growth or the occurrence of a substantial opposed orientation, which causes the intensity of the scattered rays in one and the same diffraction cone is to be no longer symmetrically distributed.

Figure 1:
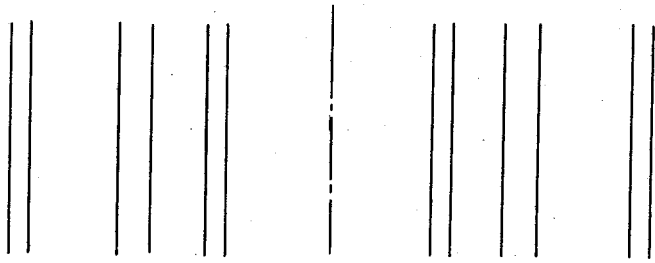
Figure 1A:
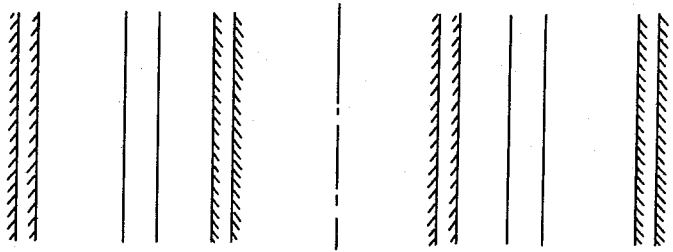
Figure 2A:
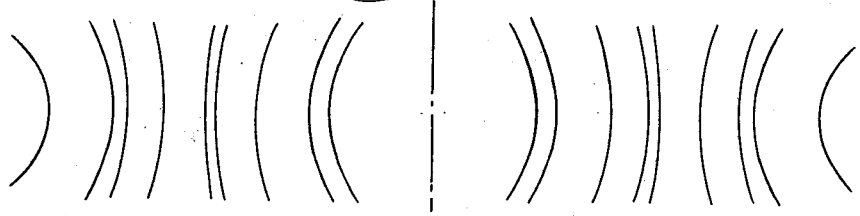
Figure 2B:
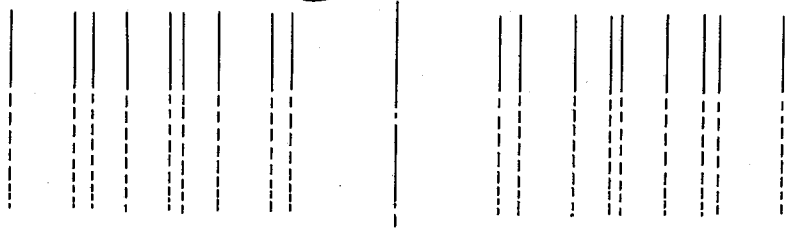
Figure 2C:
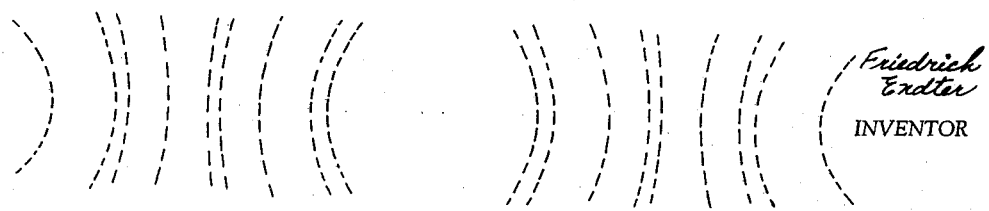
Figure 3:
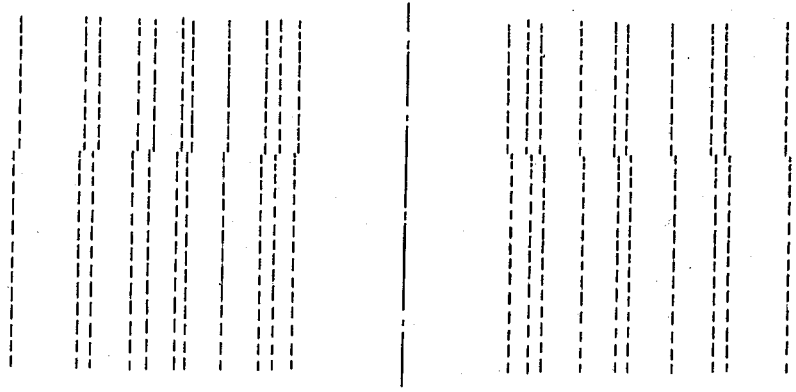
FIG. 3 shows the continuously recorded diagram of a platinum wire, in which through changes of temperature a change of the lattice dimension takes place during the recording. The decrease of the lattice constant and the accompanying increase of the diffraction angle is determined by the sharp bend of the lines.
Figure 4:
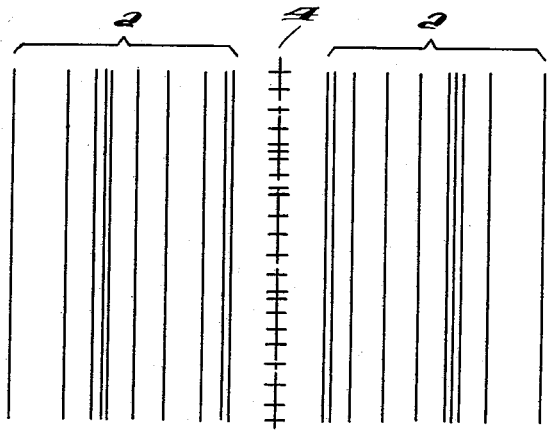
FIG. 4 shows a continuously recorded diagram with time markings.

In this drawing, 2 is a band of interference lines, while in the unexposed central part perpendicular to the direction of travel of the film the time markings 4 are recorded.

FIG. 5 shows an apparatus for carrying out the invention. It principally includes a cylindrical housing preferably formed of two parts such as 6 and 8, concentric with the test piece 10. The test piece, which in the modification shown is in the form of a rod, is fixed at one end in the concentric test piece holder 12 and projects into the heating device 14 which ends directly in front of the point where the primary ray strikes the test piece. The primary ray is directed from below through the restricted tube 16 against the test piece 10 and passes into the directing tube 18 above the test piece.

The housing 6, 8 is closed by a shell 20 which serves to carry the photographic element. The shell is movable in the longitudinal direction of the housing and carries on its inside a film 22. This film can practically completely close the space between the housing parts 6, 8, except for a slit on the lower side through which the tube 16 extends.

However, the film preferably embraces only the upper half of the housing. In this event, of course, the rays which serve for recording remain rather narrow with respect to the detectible diffraction angle. Whereas in the arrangement shown, the slit situated at the bottom permits the passage of the tube and other parts of the apparatus, it is sometimes advantageous to limit the film holder to the upper part of the housing, which leaves the lower half free for additional apparatus.

Film holder 20 is provided with longitudinal ribs 24, which run on guides 26 by interposed balls. The travel of the film carrier on these guides can be produced in any suitable manner, for instance, through an endless cable 28 wound on a roller 30 which can be driven at adjustable speeds by motor 32. The films are secured in the film holder by stops 34, 36, one of which (34) is stationary and the other (36) resiliently mounted so that the film is held under tension and is maintained sufficiently close to the cylindrical inner wall of the film carrier.

The passage of the outgoing pipe 18 for the primary rays is provided with a movable valve 42, which is normally held in closed position by a spring 44, but which can be moved by an electromagnet 46 carried by the housing part 8 so that the passage can be regulated at will.

In order to prevent an undue heating of the film by the heating of the test piece, it is desirable to provide the housing 6, 8 with a cooling arrangement such as cooling coils 47. The test piece is preferably mounted for rotation, this being accomplished by mounting the holder 12 for rotation which can be produced by a motor 48 through gearing 50.

The heating of the test piece can also be carried out, as shown in FIG. 7, by heat radiating bodies 52 inside the housing on both sides of the primary ray tube in the direct neighborhood of the test piece. To supply insulation of the film, the space between the test piece and the film can be provided with an insulating element such as a highly reflective aluminum foil 54 which reflects strongly the heat rays but permits the passage of the Roentgen rays without weakening them. It is also possible to coat the film or the film carrier directly with such aluminum foil which then plays the part of a filter for the weakening of the background density which is produced by the white radiation fraction of the primary ray.

Finally, when the test piece is formed of metal or other electrically conductive material, it can be connected at both ends to a current source so as to be heated by the flow of current through it. Such an arrangement is shown in part in FIG. 8, where the test piece 10 is held in two metal cups 58 which are insulated from the holders 12' and 14' and are connected to opposite terminals of a source of current.

For following changes in structure which take place independently of changes in temperature, the heating and cooling parts of the mechanism are unnecessary.

The test piece holder is preferably constructed so that it is capable of adjustment so that the test piece turns perfectly symmetrically about its longitudinal axis, and that the test piece can then be brought by a parallel displacement to the central axis of the whole arrangement.

For detecting chemical reactions, which take place on the surface of solid bodies upon contact with gases or vapors, a gas inlet pipe can be provided in the test piece holder leading up to the test piece. For example, as shown in FIG. 9, the holder 14" may have a gas passage 60 therethrough which terminates in an angular nozzle 62 directed towards the test piece, so that gas supplied to the passage will flow over the surface of the piece during the testing.

When the preparation to be tested is in powder form, it may, as shown in FIG. 10, be enclosed in a small tube 64 of glass or quartz, having its ends held in the holders 12 and 14, and having inlet and outlet pipes 66 cemented thereto for passage of a gas through the tube in contact with the material. On the other hand, the gas or vapor may be introduced into the tube with the enclosed powder material, and the inlet and outlet can then be sealed and the progress of the reaction observed.

In the same way, by use of heating or cooling devices, reactions between gases or vapors can be observed at elevated or lowered temperatures.

In order to preserve a properly corresponding relation between the time axis of the diffraction diagram and the other measured values, which indicate the condition of the test piece during the recording, it is possible to register the time markings directly on the film by means of an arrangement which normally completely shuts off the primary rays from the film.

Such an arrangement is shown in FIG. 11. Here a narrow strip 70 extends on either side from the primary ray outlet tube in the direction of the longitudinal axis to protect the central strip of the film from the secondary or scatter rays. Above the tube 18, between it and the film, is a narrow slit diaphragm 72 provided with a shutter 74. This shutter can be moved in any suitable manner for periodically uncovering slit 72 to permit a marking to register on the film.

The opening of the shutter can be produced, for example, by an electromagnet 76. This magnet may be controlled in many ways, as for instance it can be energized at predetermined fixed intervals by closing of switch 78.

However, where the time markings are to correspond to predetermined points on a temperature curve, the magnet may be intermittently operated when the temperature of the test piece reaches predetermined temperatures. This can be accomplished by connecting in a control circuit for the magnet a temperature-responsive switch arrangement 80 which will close the circuit momentarily at predetermined points in the temperature range to permit the primary rays to register on the film.

The procedure according to the invention is likewise applicable to other known methods of structure analysis, such as the straight through ray or "pin-hole" method, as well as the reflected ray method with flat or cylindrical cameras. These involve only the principal difference that the sensitive material which serves for recording of the scatter rays during the changes which are to be observed is moved with a speed which is dependent on the intensity of the scatter rays. Arrangements can also be provided for carrying out the tests under vacuum or under pressure.

For using electron rays and other corpuscular rays, the same procedure is in general applicable, but a pressure of less than $10^{-3}$ Torr should be maintained.

The invention in its various aspects makes it possible to solve all problems in which the continuous recording of changes in the grain structure of solid bodies is important. It is especially valuable for using suitable rays for following changes as a function of temperature, or of the heat treatment of metals or other solid bodies in the presence of various atmospheres. Also, corrosion problems, reactions between solids or between solids and gases or vapors and even between fluids and solids can be measured, such as diffusion phenomena in solid phase, progress of catalytic reactions such as activation or purification, and finally mechanical working stresses inside a solid body.

While I have described herein several embodiments of my invention, I wish it to be understood that I do not intend to limit myself thereby except within the scope of the claims hereto or hereinafter appended.

I claim:

1. A method of continuously following structural changes in materials, which comprises impinging a beam of interference generating rays on the material, and moving a sheet of a material sensitive to the scatter rays emitted from the material continuously across the field of such scatter rays in a direction in which the material remains immovable at a speed sufficiently slow, relative to the intensities of the scatter rays, to produce a clear record thereon, and confining the primary rays to a narrow path while permitting the dispersion of the scatter rays over a widely conically spread field of at least one scattering angle to impinge upon the sensitive material.

2. Apparatus for continuously following the structural changes in a test material, comprising a holder for the material, means to direct a narrow beam of primary interference generating rays against the material, means for conducting away the primary rays leaving the material in a limited path, and means for continuously moving a sheet of material sensitive to the scatter rays in the field of a wide conical dispersion of the scatter rays in a direction in which the material is held stationary by the holding means.

3. In a device as claimed in claim 2, means to register time markings on successive areas of the sensitive material.

4. Apparatus for continuously following the structural changes in a test material, comprising a casing formed of two at least partly cylindrical coaxial spaced parts, an at least partly cylindrical cover mounted on the outside of said parts for movement in the direction of the axes thereof, means associated with said casing to hold a test piece therein at the axis thereof and opposite the space between the casing parts, means in said casing to direct a narrow beam of primary interference generating rays against the material, means for conducting away the primary rays leaving the material in a limited path, and means for continuously moving said cover in the direction of the casing axis in the field of a wide conical dispersion of the scatter rays emitted from the test piece in a direction in which the holding means holds the test piece stationary, said cover holding on its inner face a sheet of a material sensitive to the scatter rays.

5. In a device as claimed in claim 4, means for closing off at will said primary ray conducting means.

References Cited in the file of this patent

UNITED STATES PATENTS

| 2,396,069 | Zapp | Mar. 5, 1946 |
| 2,584,962 | Gross | Feb. 5, 1952 |
| 2,687,477 | Pfaff | Aug. 24, 1954 |
| 2,714,669 | Wuppermann | Aug. 2, 1955 |
| 2,798,163 | Nishigaki | July 2, 1957 |

FOREIGN PATENTS

| 556,383 | Germany | Aug. 9, 1932 |
| 670,322 | Germany | Jan. 16, 1939 |
| 533,697 | Great Britain | Feb. 18, 1941 |